United States Patent
Nygren et al.

(10) Patent No.: US 10,482,043 B2
(45) Date of Patent: Nov. 19, 2019

(54) NONDETERMINISTIC MEMORY ACCESS REQUESTS TO NON-VOLATILE MEMORY

(71) Applicant: Advanced Micro Devices, Inc., Sunnyvale, CA (US)

(72) Inventors: Aaron Nygren, Sunnyvale, CA (US); Michael Ignatowski, Austin, TX (US); David A. Roberts, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 82 days.

(21) Appl. No.: 15/663,403

(22) Filed: Jul. 28, 2017

(65) Prior Publication Data

US 2018/0060257 A1    Mar. 1, 2018

Related U.S. Application Data

(60) Provisional application No. 62/380,614, filed on Aug. 29, 2016.

(51) Int. Cl.
*G06F 13/16* (2006.01)
*G06F 11/10* (2006.01)

(52) U.S. Cl.
CPC ...... *G06F 13/1673* (2013.01); *G06F 11/1004* (2013.01); *G06F 13/1689* (2013.01)

(58) Field of Classification Search
CPC ............. G06F 13/1673; G06F 13/1689; G06F 12/0246; G06F 12/0862
See application file for complete search history.

(56) References Cited

U.S. PATENT DOCUMENTS 9,250,999 B1 *   2/2016   Barroso ............... G06F 12/0246

* cited by examiner

*Primary Examiner* — Gary W. Cygiel

(57) ABSTRACT

A memory module includes a memory, a cache to cache copies of information stored in the memory, and a controller. The controller is configured to access first data from the memory or the cache in response to receiving a read request from a processor. The controller is also configured to transmit a first signal a first nondeterministic time interval after receiving the read request. The first signal indicates that the first data is available. The controller is further configured to transmit a second signal a first deterministic time interval after receiving a first transmit request from the processor in response to the first signal. The second signal includes the first data. The memory module also includes a buffer to store a write request until completion and a counter that is incremented in response to receiving the write request and decremented in response to completing the write request.

20 Claims, 6 Drawing Sheets

NONDETERMINISTIC MEMORY ACCESS REQUESTS TO NON-VOLATILE MEMORY

BACKGROUND

A conventional dual in-line memory module (DIMM) is implemented as a set of dynamic random access memory (DRAM) integrated circuits mounted on a printed circuit board. For example, dual data rate (DDR) DIMMs use a set of DRAM memory elements that are coupled to a memory bus by a high-bandwidth interface. Different generations of DIMMs, such as DDR, DDR2, DDR3, and DDR4, are characterized by different pin counts, notch positions, signaling voltages, timings, and the like, which are defined by corresponding standards established by the Joint Electron Device Engineering Council (JEDEC) Solid State Technology Association. For example, a DIMM that operates according to the DDR4 standards uses synchronous DRAM (SDRAM) to provide up to 512 gigabytes (GB) of memory that are accessible at frequencies between 800 and 4,266 megahertz (MHz) and operate at voltages between 1.2 volts and 1.4 volts. The DRAM elements in a DIMM do not maintain the stored data once power has been removed or falls below a threshold required to maintain data integrity in the DRAM. Moreover, the memory access latency of a conventional DIMM is deterministic, e.g., the number of cycles between sending a read request to the DIMM and receiving the requested information at the requesting processor is a predetermined, known value.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
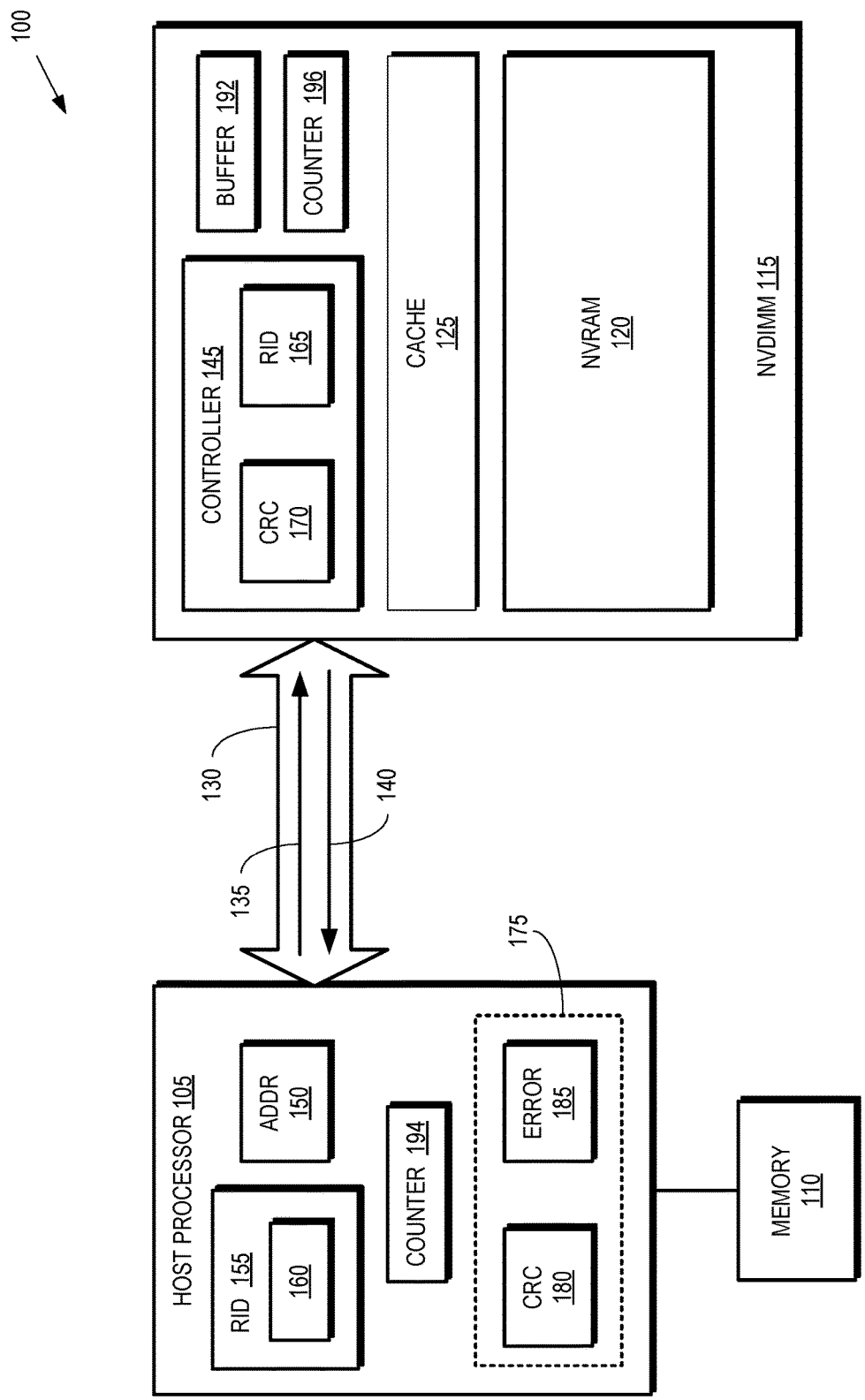
FIG. 1 is a block diagram of a processing system according to some embodiments.

Nonvolatile random access memory (NVRAM) retains data even when power is removed from the NVRAM. Memory elements constructed of NVRAM cells can be used to implement DIMM that support persistent storage of information. For example, an NVRAM DIMM (or NVDIMM) persistently stores data even when power is removed from the NVDIMM. Response latencies of access requests to NVRAM are often nondeterministic, e.g., some blocks in a NAND Flash memory can have different memory access latencies than other blocks and additional latency can occur due to error correction techniques implemented by the NVRAM, level of wearout of different blocks in the NVRAM, and the like. In some cases, an NVDIMM includes one or more caches to reduce memory access latency in the NVDIMM. The caches can be implemented as DRAM, SDRAM, or any other memory type that has a memory access latency that is lower than the memory access latency of the corresponding NVRAM. Incorporating a cache can increase the range of possible response latencies because the requesting processor does not know whether the requested address is going to hit in the cache (with relatively low latency) or miss the cache and be directed to the NVRAM (with relatively high latency). The nondeterministic response latencies can cause the memory access requests to be fulfilled in a different order than they were submitted to the NVDIMM. For example, a first read request can be submitted prior to a second read request. The second read request can be fulfilled before the first read request if the second read request hits in the cache (low latency) and the first read request misses the cache and the requested information must be read from the NVRAM (high latency). Furthermore, cached information can be lost during power loss because the memory used to implement the cache (e.g. DRAM) is not persistent.

FIGS. 1-6 illustrate an NVDIMM with an internal cache that is implemented using a command-response protocol in which a processor sends a read request to the NVDIMM and the NVDIMM provides a response signal to the processor after a nondeterministic time interval to indicate that the requested data is available. The processor sends a transmit request to request transmission of the data in response to receiving the response signal from the NVDIMM. The NVDIMM transmits data to the processor a deterministic time interval after the processor sends the transmit request. Some embodiments of the data transmitted to the processor include information stored at an address indicated in the read request, a read identifier that is used to distinguish the read requests from other read requests issued by the processor, and error correction information. Out-of-order data received from the NVDIMM in response to multiple read requests can therefore be reordered by the processor on the basis of the read identifiers in the received data. Some embodiments of the processor transmit speculative read requests that assume that the requested data is stored in the internal cache, in which case the requested data would be returned after a deterministic time interval. The processor reserves resources of a memory bus for transmission of the requested data based on the deterministic time interval. The NVDIMM provides the requested data using the reserved resources if the requested data is actually stored in the internal cache. However, if the requested data is not stored in the internal cache, the requested data is not returned using the reserved resources. Instead, the NVDIMM provides a response signal to the processor after a nondeterministic time interval to indicate when the requested data is available.

Write requests to the NVDIMM are also nondeterministic because the time required to complete a write request depends on whether the write request hits in the internal cache or not. For example, the time required to write information to the internal cache (e.g., in the case of a cache hit) is shorter than the time required to write information to the NVRAM (e.g., in the case of a cache miss). Some embodiments of the NVDIMM therefore include a buffer to store write requests until they are completed. The processor and the NVDIMM maintain counters that indicate a number of buffered write requests and the processor stops sending write requests if the number indicates that the buffer at the NVDIMM is full. The counters are incremented in response to transmission of each write request from the processor and reception of each write request at the NVDIMM. The NVDIMM decrements its counter in response to completing a write request and sends a signal to the processor, which decrements its counter in response to receiving the signal. Some embodiments of the processor can transmit a persistent write request to request that data be written directly to the NVRAM to ensure that the data is stored persistently.

FIG. 1 is a block diagram of a processing system 100 according to some embodiments. The processing system 100 includes a host processor 105, which can be implemented as a central processing unit (CPU), graphics processing unit (GPU), application-specific integrated circuit (ASIC), field programmable gate array (FPGA), and the like. Some embodiments of the host processor 105 are coupled to a memory 110 that can be implemented internally or externally to the host processor 105. The host processor 105 can execute instructions stored in the memory 110 and is configured to store information in the memory 110 such as the results of the executed instructions. In the following, operation of the processing system 100 is described in the context of a system that implements nonvolatile memory that is configured in a DIMM form factor. However, some embodiments of the processing system 100 do not implement nonvolatile memory or memory that is configured in a DIMM form factor. For example, stacked memory can be implemented in the processing system 100. Some embodiments of the techniques disclosed herein are therefore implemented in processing systems that include different levels of memory with different latencies, which can be variable in some cases.

The illustrated embodiment of the processing system 100 includes a nonvolatile, dual in-line memory module (NVDIMM) 115 that is used to provide a persistent storage for instructions or data. In some embodiments, the processing system 100 does not include the memory 110 and the host processor 105 can execute instructions stored in the NVDIMM 115 and is configured to store information in the NVDIMM 115 such as the results of the executed instructions. As used herein, the term "persistent" indicates that information stored in the NVDIMM 115 is preserved in the event that power supplied to the NVDIMM 115 is reduced or interrupted. The NVDIMM 115 includes a nonvolatile random access memory (NVRAM) 120 that implements nonvolatile memory cells to support persistent storage of data in the NVRAM 120. The NVDIMM 115 also includes a cache 125 that is used to cache copies of information that are stored in the NVRAM 120. The cache 125 is implemented with memory elements that support memory access requests at a lower latency than the NVRAM 120. For example, the latency for reading information from the cache 125 is lower than the latency for reading information from the NVRAM 120. Some embodiments of the cache 125 are implemented as dynamic RAM (DRAM) so data stored in the cache 125 is not persistent because data stored in the DRAM is lost if power supplied to the DRAM is reduced or interrupted.

The host processor 105 communicates with the NVDIMM 115 over a bus 130 or other communication network. The host processor 105 is configured to transmit commands 135 such as memory access requests to the NVDIMM 115. For example, the host processor 105 can transmit a read (or load) request to retrieve information stored in the NVDIMM 115. For another example, the host processor 105 can transmit a write (or store) request to store information in the NVDIMM 115. The NVDIMM 115 is configured to transmit signals 140, such as responses to the commands 135, to the host processor 105 via the bus 130.

A controller 145 receives the commands 135 and then generates response signals 140 for transmission over the bus 130. If the command 135 is a memory access request, the controller 145 attempts to service the memory access request using the cache 125 because the latency for servicing a request using the cache 125 is lower than the latency for servicing a request from the NVRAM 120. For example, in response to receiving a read request including an address of a line, the controller 145 checks the cache 125 to determine whether the requested line is in the cache (a cache "hit"). If so, the controller 145 can read the data from the requested line and return the data to the host processor 105 in a response signal 140. If the requested line is not in the cache (a cache "miss"), the controller 145 read the data from the requested line in the NVRAM 120 and returns the data to the host processor 105 in a response signal 140. In some embodiments, the requested line is stored in the cache 125 (and a line in the cache may be evicted) in response to the cache miss.

The latency for a memory access request to the cache 125 is deterministic in some embodiments. As used herein, the term "deterministic" indicates that the time interval required to perform an action is known prior to performing the action. For example, data can be read from the cache 125 a predetermined number of clock cycles after the controller 145 receives a read request from the host processor 105. In contrast, the latency for a memory access request to the NVRAM 120 is nondeterministic in some embodiments. As used herein, the term "nondeterministic" indicates that the time interval required to perform an action is not known prior to performing the action. For example, the latency required to read data from the NVRAM 120 in response to a read request is not necessarily known at the time the read request is received by the controller 145 because different memory blocks in the NVRAM 120 can have different intrinsic memory access latencies, different error correction techniques implemented by the NVRAM 120 can cause different memory access latencies, the varying level of wearout of different blocks in the NVRAM 120 can cause the memory access latency to vary, and the like. Incorporating the cache 125 increases the range of possible response latencies because the host processor 105 does not know whether the requested address is going to hit in the cache 125 (with relatively low latency) or miss the cache 125 and be directed to the NVRAM 120 (with relatively high latency).

The nondeterministic memory access latency can cause unpredictable behavior such as receiving responses to memory access requests in a different order than the memory access requests were issued. For example, if the host processor 105 sends a first read request followed by a second request and the second read request hits in the cache 125 while the first read request misses in the cache 125 and requires reading data from the NVRAM 120, the host processor 105 can receive the data for the second read request before receiving the data for the first read request. At least in part to manage the nondeterministic memory access latencies, the NVDIMM 115 uses a two-step process to respond to the read requests from the host processor 105. In response to locating the requested data in either the cache 125 or the NVRAM 120, some embodiments of the controller 145 in the NVDIMM 115 are configured to transmit a first signal a first nondeterministic time interval after receiving a read request from the host processor 105 to indicate that the requested data is available. The controller 145 then waits for a transmit request from the host processor 105. In response to receiving the transmit request, the controller 145 transmits a second signal a first deterministic time interval after receiving the transmit request. The second signal includes the requested data.

Some embodiments of the commands 135, such as read access requests, are associated with an identifier such as a read identifier (RID) that is associated with each read request. For example, the host processor 105 can include address (ADDR) logic 150 that generates addresses of the locations of the data in the NVRAM 120 and RID logic 155 that generates an identifier, which is associated with the address and the corresponding read request. Some embodiments of the RID logic 155 store a mapping of the address to the identifier in an address table 160. The controller 145 also includes RID logic 165 that generates a local version of the identifier in response to receiving the read request. The identifiers generated by the RID logic 155 and the RID logic 165 should be synchronized and have the same values. Alternatively, the identifier generated by the RID logic 155 can be transmitted to the NVDIMM 115 as part of the read access request. The identifier can be included in the response signals 140 and used to reorder information that is received out of order relative to the order of the read requests. For example, if data is returned out of order in response to first and second read requests, the host processor 105 can use the identifier included in the response signals 140 to reorder the responses.

Error correction information can be included in the response signal 140 to verify the integrity of the data received with the response signal 140. In the illustrated embodiment, the error correction information includes a cyclic redundancy check (CRC) that is calculated by CRC logic 170 implemented by the controller 145. The CRC logic 170 calculates a CRC value based on the information included in the response signal 140. For example, if the response signal 140 includes data requested in a previously received read request and a read identifier associated with the read request, the CRC value can be calculated using the values of the bits that represent the data and the read identifier. The CRC value calculated by the CRC logic 170 is appended to the other contents of the response signal 140, which can therefore include the requested data, the read identifier, and the CRC value.

The host processor 105 implements error-checking circuitry 175 that verifies the integrity of received data based on the included error correction information. In the illustrated embodiment, the error-checking circuitry 175 includes CRC logic 180 to calculate a comparison CRC value from the received information. For example, the CRC logic 180 can calculate the comparison CRC value using bit values representative of the requested data and (if present) the read identifier. Error detection logic 185 compares the received CRC value with the comparison CRC value and verifies integrity of the received data if the received and comparison CRC values match. The error detection logic 185 outputs an error condition if the received and comparison CRC values are different. An error condition can indicate an error in the address transmitted from the host processor 105 to the NVDIMM 115, an error in transmission of the data, read identifier, or CRC value in the response signal 140, an error in synchronization between the read identifiers calculated by the host processor 105 and the NVDIMM 115, and the like.

Some embodiments of the host processor 105 are able to transmit commands 135 that include different types of read requests. For example, the host processor 105 can transmit a nondeterministic read request. The requested data becomes available for transmission from the NVDIMM 115 after a nondeterministic time interval, at which time the controller 145 sends a response signal 140 indicating that the data is available. The host processor 105 then transmits a send (or fetch) command to request transmission of the available data and the NVDIMM 115 returns the data a deterministic time interval after receiving the send request. For another example, the host processor 105 can transmit a speculative deterministic read request and reserve resources of the bus 130 for a response signal 140 that is expected to be returned after a deterministic time interval because the host processor 105 expects that the speculative deterministic read request will hit in the cache 125. If so, the NVDIMM 115 returns the data using the reserved resources. If the speculative deterministic read request misses in the cache 125, the controller 145 only returns information indicating an estimated time interval to retrieve the data from the NVRAM 120. The host processor 105 then transmits a send request after the estimated time interval has elapsed or in response to the NVDIMM 115 providing a signal 140 indicating that the data is ready. For yet another example, the host processor 105 can transmit a non-cached read request so that the retrieved data is not stored in the cache 125. For yet another example, the host processor 105 can transmit a deterministic send request to request that the NVDIMM 115 send queued data with a corresponding identifier.

Requests to write (or store) data to the NVRAM 120 are also nondeterministic. The latency to complete a write request is relatively short if the request hits in the cache 125 so that the data can be written to a cache line and the latency to complete the write request is relatively long (and nondeterministic) if the request misses in the cache 125 so that the data has to be written to the NVRAM 120. The NVDIMM 115 implements a buffer 192 to store write requests until they are completed by writing the data to the cache 125 or the NVRAM 120. The buffer 192 includes space sufficient to hold a predetermined number of write requests. Write requests in excess of the predetermined number are dropped. The host processor 105 and the NVDIMM 115 therefore maintain counters 194, 196, respectively, which are used to count the number of pending write requests that are stored in the buffer 192. The counter 194 is incremented in response to the host processor 105 transmitting a write request and the counter 196 is incremented in response to the NVDIMM 115 receiving the write request. The counter 196 is decremented in response to the controller 145 completing a write request and the counter 194 is decremented in response to the host processor 105 receiving a response signal 140 indicating that the write request has been completed. The host processor 105 stops transmitting write requests in response to the counter 194 reaching a maximum value that corresponds to the predetermined number of write requests that can be stored in the buffer 192. Completed write requests are removed from the buffer 192 to provide space for subsequent write requests.

Some embodiments of the host processor 105 are able to transmit different types of write requests. For example, the host processor 105 can transmit a non-persistent write request that allows the controller 145 to write data to either the cache 125 or the NVRAM 120. The host processor 105 and the controller 145 utilize corresponding counters 194 and 196, respectively, to prevent overflow the buffer 192 as a result of too many non-persistent write requests, as discussed herein. For another example, the host processor 105 can transmit a persistent write request that requires that the controller 145 write data to the NVRAM 120 to guarantee that the data is stored persistently. The counters 194, 196 can also be used in this case to prevent buffer overflow. For yet another example, the host processor 105 can transmit a write-around cache request to force the controller 145 to bypass writing the data to the cache 125 and only write the data to the NVRAM 120.

The host processor 105 can also implement other commands to control storage of data in the NVRAM 120 and the cache 125. For example, on-module data movement commands can be used to move data between the NVRAM 120 and the cache 125. This allows the host processor to preload the cache 125 or to replicate data stored in the cache 125 or the NVRAM 120. The host processor 105 can also issue flush commands to commit data stored in the cache 125 or the buffer 192 to the persistent NVRAM 120.

Figure 2:
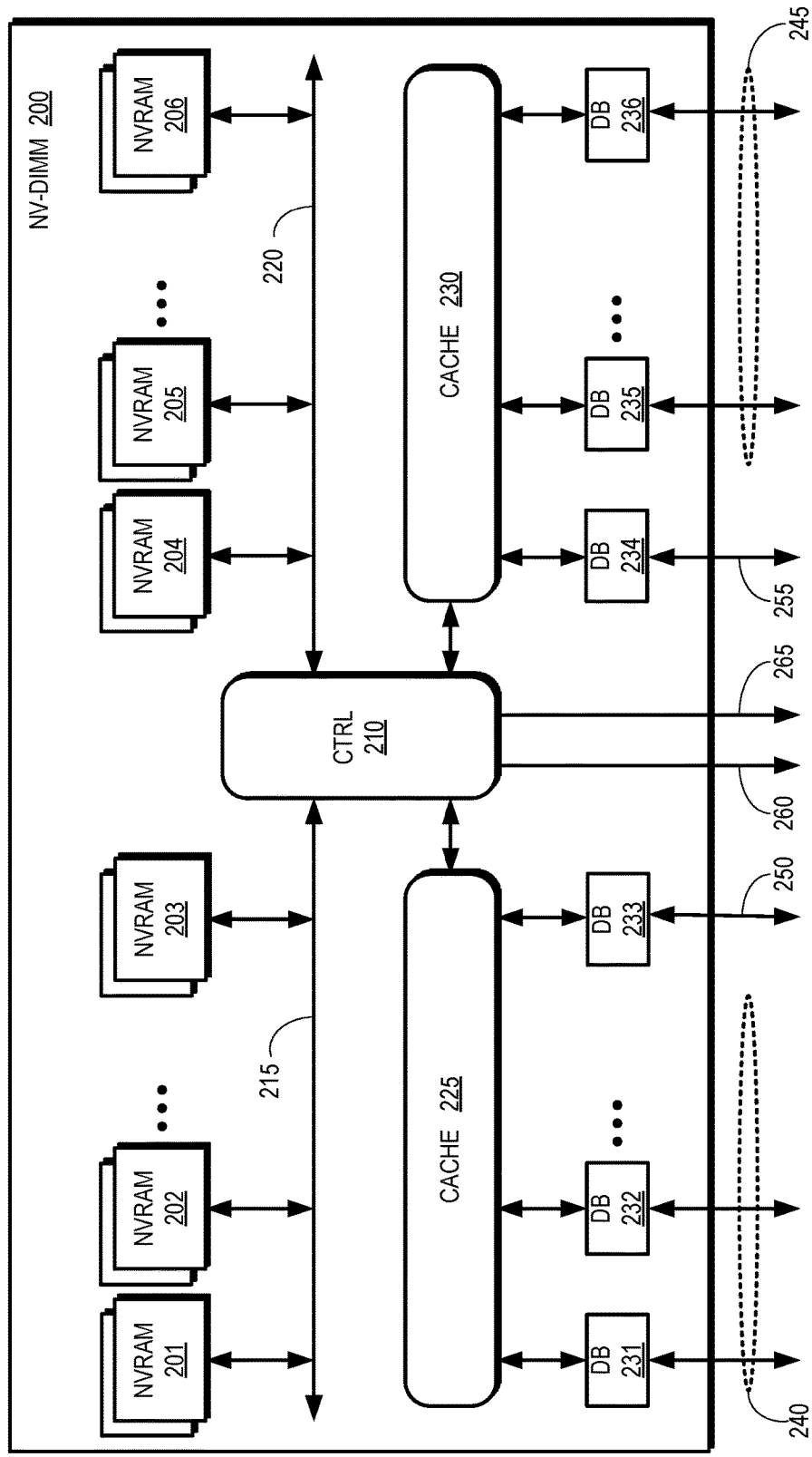
FIG. 2 is a block diagram of a nonvolatile dual in-line memory module (NVDIMM) according to some embodiments.

FIG. 2 is a block diagram of an NVDIMM 200 according to some embodiments. The NVDIMM 200 is used to implement some embodiments of the NVDIMM 115 shown in FIG. 1. The NVDIMM 200 includes a set of NVRAM 201, 202, 203, 204, 205, 206 that are collectively referred to herein as "the NVRAM 201-206." In the illustrated embodiment, each of the NVRAM 201-206 is configured to store a predetermined amount of information such as 2 terabytes (TB). The NVRAM 201-206 communicate with a controller 210 using internal buses 215, 220. The controller 210 is used to implement some embodiments of the controller 145 shown in FIG. 1. The NVDIMM 200 also includes caches 225, 230 that are used to cache copies of data stored in the NVRAM 201-206. For example, the cache 225 is configured to cache copies of data stored in the NVRAM 201-203 and the cache 230 is configured to cache copies of data stored in the NVRAM 204-206.

Data is read from or written to the caches 225, 230 using data buses (DB) 231, 232, 233, 234, 235, 236, which are collectively referred to herein as "the DB 231-236." The illustrated embodiment of the NVDIMM 200 supports two independent channels 240, 245 (and corresponding sets of pins) for conveying information to and from the NVDIMM 200. Error correction information for the channels 240, 245 are conveyed using pins 250, 255, respectively. Pins 260, 265 are used to convey response signals for the channels 240, 245, respectively. The response signals can include strobe signals or they may be pulse width modulated signals that do not include strobe signals. The pins 260, 265 could therefore be implemented as four half rate pins.

Figure 3:
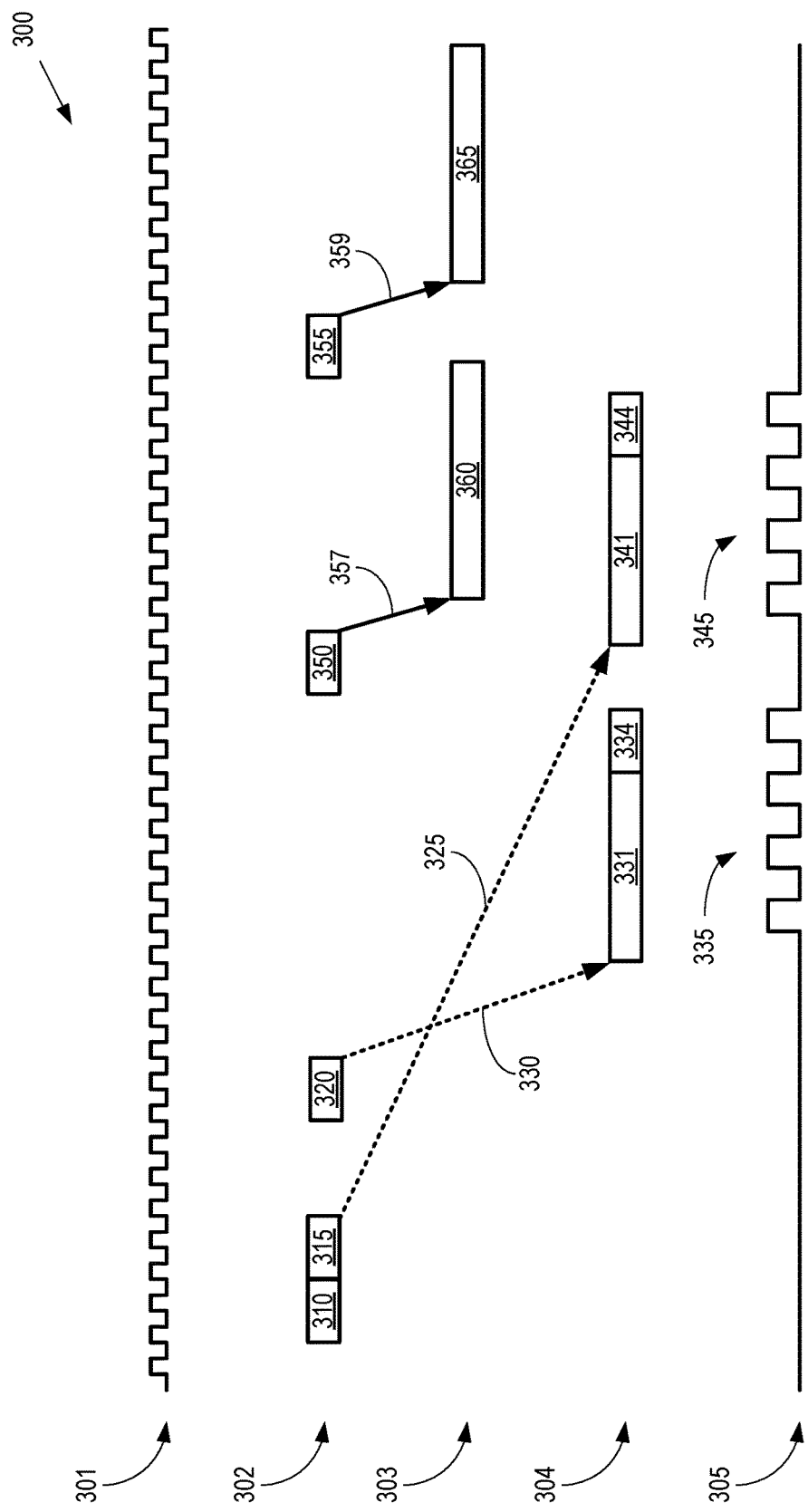
FIG. 3 is a diagram that illustrates timing of signals transmitted by a host processor and an NVDIMM during a read process according to some embodiments.

FIG. 3 is a diagram that illustrates timing 300 of signals transmitted by host processor and an NVDIMM during a read process according to some embodiments. The timing 300 represents signals transmitted by some embodiments of the host processor 105 and the NVDIMM 115 over the bus 130 shown in FIG. 1. The timing 300 illustrates a clock signal 301 that is used to synchronize the host processor and the NVDIMM, command signals 302 transmitted by the host processor, data and error correction signals 303 transmitted by the NVDIMM, response signals 304 transmitted by the NVDIMM, and a strobe signal 305 generated by the NVDIMM. Although the timing 300 is illustrated in the context of a synchronous bus that utilizes the clock signal 301 and the strobe signal 305, some embodiments are implemented using an asynchronous bus or without a strobe signal 305.

In the illustrated embodiment, the host processor transmits an activate signal 310 and a first read request 315 to request first data that is stored by the NVDIMM. However, some embodiments of the host processor can transmit the first read request 315 without transmitting an activate signal 310. The host processor subsequently transmits a second read request 320 to request second data that is stored by the NVDIMM. In response to receiving the first and second read requests 315, 320, the NVDIMM reads the data from a cache or an NVRAM. As discussed herein, the read process takes a nondeterministic amount of time to complete. Thus, the first and second data become available for transmission to the host processor after nondeterministic time intervals. For example, the first data becomes available after a first nondeterministic time interval 325 and the second data becomes available after a second nondeterministic time interval 330. In the illustrated embodiment, the second data becomes available before the first data because the second nondeterministic time interval 330 is less than the first nondeterministic time interval 325.

In response to the data becoming available, the NVDIMM transmits a response signal indicating that the data is available for transmission to the host processor. The response includes a set of bits that can be decoded to determine a type of the response. The types of responses can include Idle, Read Ready, Write persistent, Error, Status, and the like. For example, the response signal transmitted by the NVDIMM in response to the second data becoming available includes one or more OP bits 331 and one RFU bit 334 that indicate that the data is available and the type of the response. The NVDIMM also generates a set 335 of strobe pulses corresponding to the bits in the response signal. For another example, the response signal transmitted by the NVDIMM in response to the first data becoming available includes one or more OP bits 341 and one RFU bit 344. The NVDIMM also generates a set 345 of strobe pulses corresponding to the bits in the response signal. In the illustrated embodiment, the OP bits 331, 341 and the RFU bits 334, 344 are transmitted over a single wire. However, in some embodiments the OP bits 331, 341 and the RFU bits 334, 344 are transmitted in parallel or concurrently over multiple wires.

Once the host processor has received the response signal indicating that data is available, the host processor can transmit commands such as send requests to instruct the NVDIMM to transmit the data. For example, the host processor transmits a first send request 350 in response to receiving the response signal including the bits 331-334. For another example, the host processor transmits a second send request 355 in response to receiving the response signal including the bits 341-344. The NVDIMM provides the requested data after deterministic time intervals 357, 359. For example, the NVDIMM transmits a signal 360 one clock cycle after receiving the send request 350. For another example, the NVDIMM transmits a signal 365 one clock cycle after receiving the send request 355. The signals 360, 365 include the requested data and metadata such as a read identifier, error correction information, and the like. For example, the metadata can include a 10 bit read identifier and a 6 bit CRC value.

Figure 4:
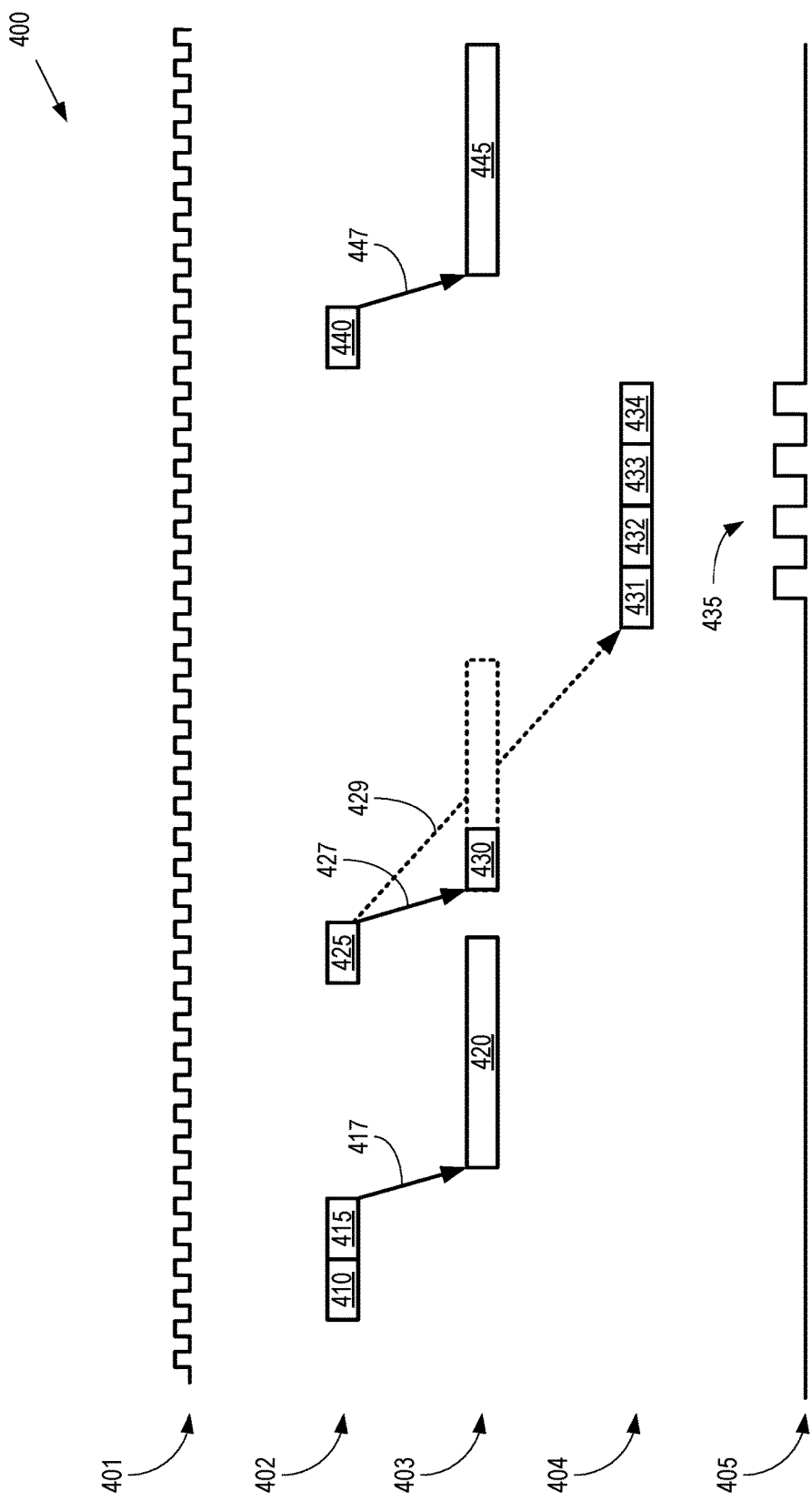
FIG. 4 is a diagram that illustrates timing of signals transmitted by host processor and an NVDIMM during a speculative read process according to some embodiments.

FIG. 4 is a diagram that illustrates timing 400 of signals transmitted by host processor and an NVDIMM during a speculative read process according to some embodiments. The timing 400 represents signals transmitted by some embodiments of the host processor 105 and the NVDIMM 115 over the bus 130 shown in FIG. 1. The timing 400 illustrates a clock signal 401 that is used to synchronize the host processor and the NVDIMM, command signals 402 transmitted by the host processor, data and error correction signals 403 transmitted by the NVDIMM, response signals 404 transmitted by the NVDIMM, and a strobe signal 405 generated by the NVDIMM.

The host processor transmits an activate signal 410 and a first speculative read request 415 to request first data that is stored by the NVDIMM. The host processor assumes that the first speculative read request 415 is going to hit in a cache implemented in the NVDIMM and consequently the requested first data will be returned in a response signal that is transmitted a deterministic time interval 417 after transmission of the first speculative read request 415. The host processor can therefore reserve resources of the bus for transmission of the response signal including the requested first data. In the illustrated embodiment, the first speculative read request 415 hits in the cache and so the NVDIMM transmits a response signal 420 using the reserved resources of the bus after the deterministic time interval 417. For example, the NVDIMM transmits the response signal 420 one clock cycle after receiving the first speculative read request 415. The response signal 420 includes the requested first data and metadata such as a read identifier, error correction information, and the like. For example, the metadata can include a 10 bit read identifier and a 6 bit CRC value.

The host processor transmits a second speculative read request 425 to request second data that is stored by the NVDIMM. The host processor also reserves resources of the bus for transmission of a response signal after a second deterministic time interval 427. In the illustrated embodiment, the second speculative read request 425 misses in the cache and so the NVDIMM attempts to locate the requested second data in the NVRAM, which results in a nondeterministic latency for servicing the second speculative read request 425. Some embodiments of the NVDIMM bypass transmitting information in the reserved resources of the bus. Other embodiments of the NVDIMM, such as the embodiment illustrated in FIG. 4, bypass transmitting requested data but transmit other information in a subset of the reserved resources after the second deterministic time interval 427. For example, the NVDIMM can transmit a response signal 430 that includes a latency estimate for the requested second data. The latency estimate can be represented as three bits that are decoded to indicate estimated latencies within a set of latencies such as <100 nanoseconds (ns), 500 ns, 1 microsecond (μs), 5 μs, 10 μs, 50 μs, 100 μs, and the like.

In response to determining that the NVDIMM did not return the requested second data in the reserved resources of the bus, the host processor defaults to the standard read request procedure. The host processor therefore waits a nondeterministic time interval 429 for a signal from the NVDIMM indicating that the requested second data is available. Once the second data becomes available, e.g., from the NVRAM, the NVDIMM transmits a response signal indicating that the second data is available for transmission to the host processor. The response includes a set of bits that can be decoded to determine a type of the response. For example, the response signal transmitted by the NVDIMM in response to the second data becoming available includes three OP bits 431, 432, 433 and one RFU bit 434. The NVDIMM also generates a set 435 of strobe pulses corresponding to the bits in the response signal.

The host processor transmits a third read request 440 to request the second data in response to receiving the response signal including the bits 431-434. The NVDIMM provides a response signal 445 including the requested second data after a deterministic time interval 447. The response signal 445 can also include metadata such as a read identifier, error correction information, and the like. For example, the metadata can include a 10 bit read identifier and a 6 bit CRC value.

Figure 5:
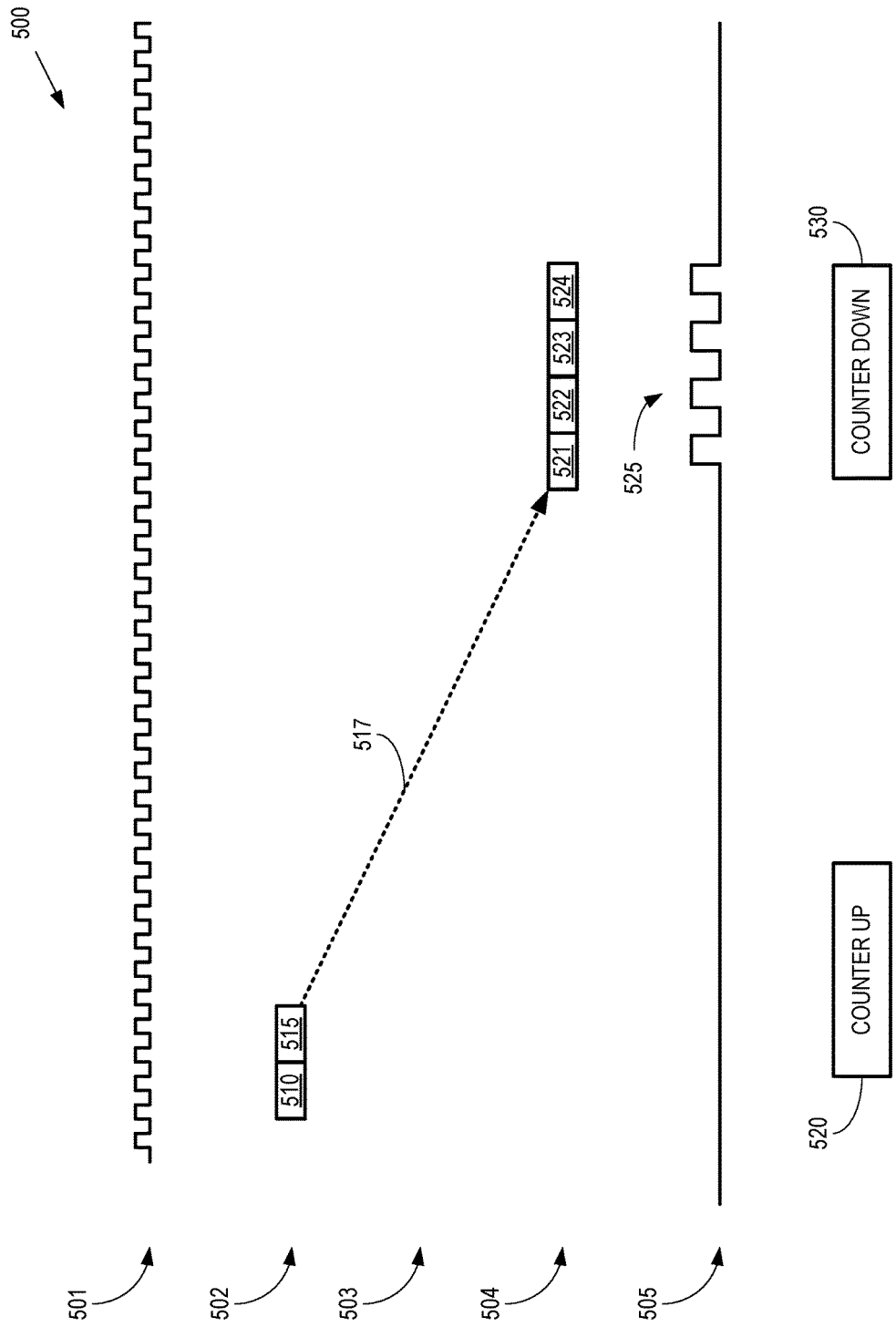
FIG. 5 is a diagram that illustrates timing of signals transmitted by host processor and an NVDIMM during a write process according to some embodiments.

FIG. 5 is a diagram that illustrates timing 500 of signals transmitted by host processor and an NVDIMM during a write process according to some embodiments. The timing 500 represents signals transmitted by some embodiments of the host processor 105 and the NVDIMM 115 over the bus 130 shown in FIG. 1. The timing 500 illustrates a clock signal 501 that is used to synchronize the host processor and the NVDIMM, command signals 502 transmitted by the host processor, data and error correction signals 503 transmitted by the NVDIMM, response signals 504 transmitted by the NVDIMM, and a strobe signal 505 generated by the NVDIMM. In the illustrated embodiment, the NVDIMM does not return data or error correction signals and so FIG. 5 does not depict any data or error correction signals 503.

The host processor transmits an activate signal 510 and a write request 515 to request that data included in the write request 515 be written to the cache or NVRAM in the NVDIMM. As discussed herein, the write operation is performed a nondeterministic time interval 517 after the write request 515 is transmitted by the host processor and received by the NVDIMM. The NVDIMM implements a buffer to store write requests until the write request has been completed. In order to prevent overflow of the buffer, the host processor and the NVDIMM implement counters to keep track of the number of buffered write requests. The counter at the host processor is incremented (at block 520) in response to transmission of the write request 515 and the counter at the NVDIMM is incremented (at block 520) in response to reception of the write request 515.

The NVDIMM transmits a response signal indicating that the write operation has been completed. In the illustrated embodiment, the response includes three OP bits 521, 522, 523 and one RFU bit 524. The NVDIMM also generates a set 525 of strobe pulses corresponding to the bits in the response signal. The counter at the NVDIMM is decremented (at block 530) in response to completion of the write operation and the counter at the host processor is decremented (at block 530) in response to reception of the response signal 521-524 that indicates completion of the write operation.

Figure 6:
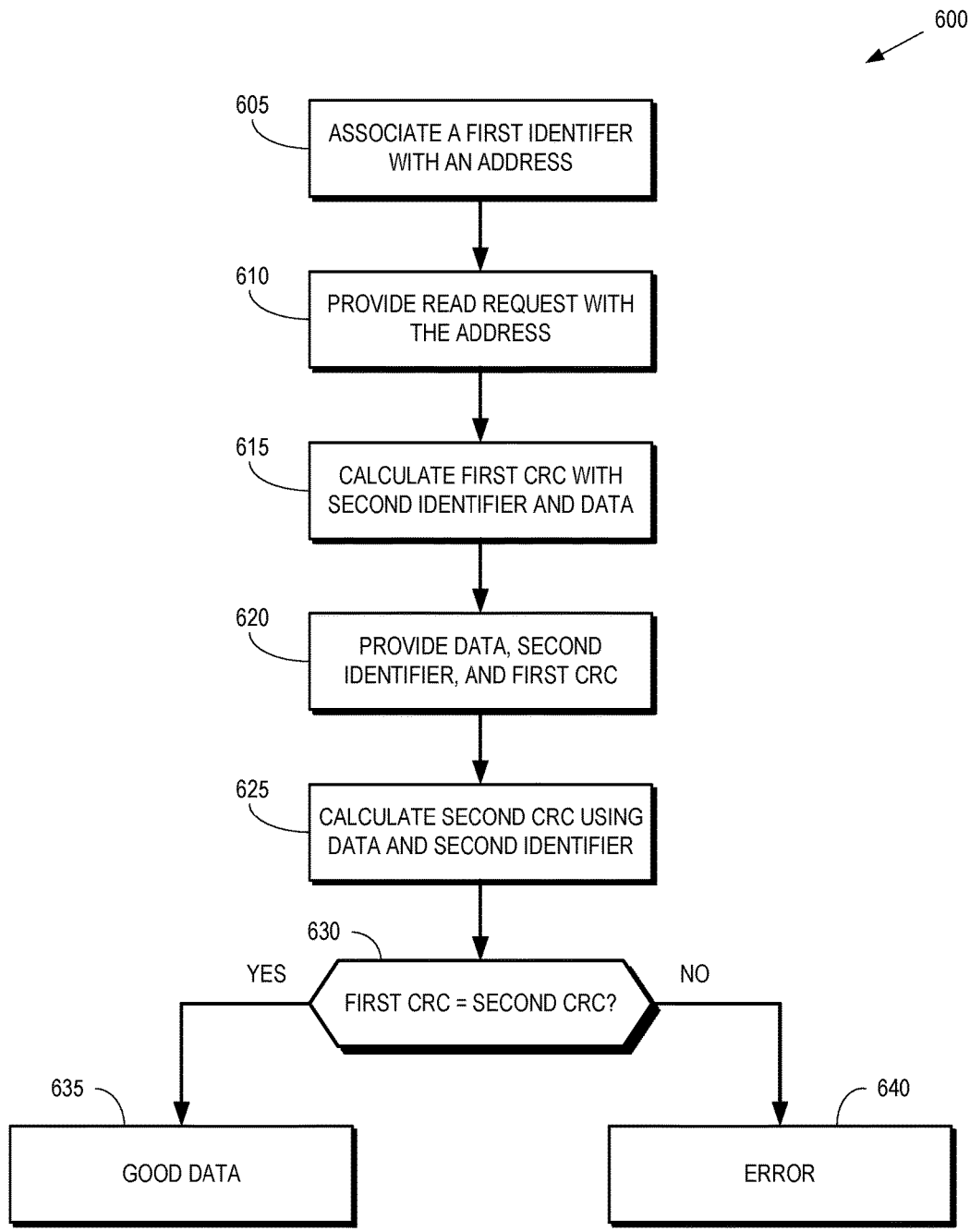
FIG. 6 is a flow diagram of a method of checking the validity of data received at a host processor from an NVDIMM in response to a read request from the host processor according to some embodiments.

FIG. 6 is a flow diagram of a method 600 of checking the validity of data received at a host processor from an NVDIMM in response to a read request from the host processor according to some embodiments. The method 600 is implemented in some embodiments of the processing system 100 shown in FIG. 1.

At block 605, the host processor associates a first identifier with an address that indicates a location of data in an NVRAM implemented by the NVDIMM. As discussed herein, a copy of the data can also be stored in a cache that is configured to cache information stored in the NVRAM. At block 610, the host processor provides a read request with the address of the data to the NVDIMM. For example, the host processor can transmit a read request over a bus such as the bus 130 shown in FIG. 1. In response to receiving the request, the NVDIMM retrieves the data from the cache or the NVRAM, e.g., as discussed herein with regard to FIGS. 3 and 4.

At block 615, the NVDIMM calculates a first cyclic redundancy check (CRC) using the retrieved data and a second identifier of the read request. The second identifier is generated by the NVDIMM. As discussed herein, the first and second identifiers should be synchronized so that the first and second identifiers have the same value to refer to the same read request. At block 620, the NVDIMM provides the retrieved data, the second identifier, and the first CRC to the host processor, e.g., by transmitting a response signal including this information over the bus. The host processor receives the signal including the retrieved data, the second identifier, and the first CRC.

At block 625, the host processor calculates a second CRC using the retrieved data and the second identifier. At decision block 630, the host processor compares the value of the first CRC to the value of the second CRC. If the first CRC matches the second CRC, the method 600 flows to block 635 and the host processor verifies that the response signal includes a valid copy of the retrieved data. If the first CRC does not match the second CRC, the method 600 flows to block 640 and the host processor generates a signal indicating that there is an error in the received information. For example, the host processor could detect an error in address/data transmission, an error in the transmission of the second identifier or the second CRC value, an error in synchronization of the first and second identifiers, and the like.

In some embodiments, the apparatus and techniques described above are implemented in a system comprising one or more integrated circuit (IC) devices (also referred to as integrated circuit packages or microchips), such as the processing system described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
    a cache to cache copies of information stored in a memory; and
    a controller to:
        access first data from the memory or the cache in response to receiving a read request from a processor;
        transmit a first signal a first nondeterministic time interval after receiving the read request, wherein the first signal indicates that the accessed first data is available for transmission from the controller to the processor; and
        transmit a second signal a first deterministic time interval after receiving a first transmit request sent by the processor in response to the first signal, wherein the second signal includes the accessed first data.

2. The apparatus of claim 1, wherein the controller is configured to transmit the second signal including an identifier associated with the read request.

3. The apparatus of claim 1, wherein the controller is configured to transmit the second signal including error correction information formed using the first data.

4. The apparatus of claim 1, wherein the controller is to:
receive a speculative read request from the processor for second data;
transmit a third signal a second deterministic time interval after receiving the speculative read request in response to the second data being in the cache;
transmit a fourth signal a third deterministic time interval after receiving the speculative read request in response to the second data not being in the cache, the fourth signal indicating an estimate of a second nondeterministic time interval before the second data is expected to be available from the memory; and
transmit a fifth signal a fourth deterministic time interval after receiving a second transmit request from the processor in response to the fourth signal, wherein the fifth signal includes the second data.

5. The apparatus of claim 1, further comprising:
a buffer to store a first write request until the first write request is completed; and
a counter that is incremented in response to receiving the first write request and decremented in response to completing the first write request.

6. The apparatus of claim 5, wherein the controller is configured to transmit a sixth signal a third nondeterministic time interval after receiving the first write request, wherein the sixth signal indicates that the first write request has been completed.

7. The apparatus of claim 1, wherein the controller is configured to write second data to the memory in response to receiving a persistent write request including the second data.

8. The apparatus of claim 1, wherein the memory is a nonvolatile random access memory, and wherein the cache is a dynamic random access memory.

9. An apparatus comprising:
a processor to:
provide a read request for first data for receipt by a controller of an external memory;
receive a first signal from the controller at a first nondeterministic time interval after transmitting the read request, wherein the first signal indicates that the first data is available for transmission from the controller to the processor;
provide a first transmit signal for receipt by the controller in response to the first signal;
receive a second signal from the controller at a first deterministic time interval after providing the first transmit signal, wherein the second signal includes the first data; and
provide the first data for storage.

10. The apparatus of claim 9, wherein the processor is configured to generate an address of the first data and a first identifier associated with the read request.

11. The apparatus of claim 10, wherein the processor is configured to:
receive the second signal including first error correction information formed using the first data and a second identifier associated with the read request;
calculate second error correction information using the first data and the second identifier; and
compare the first and second error correction information to detect errors in the second signal.

12. The apparatus of claim 9, wherein the processor is to:
provide a speculative read request for second data;
receive a third signal a second deterministic time interval after providing the speculative read request in response to the second data being in an external cache;
receive a fourth signal a third deterministic time interval after receiving the speculative read request in response to the second data not being in the external cache, the fourth signal indicating an estimate of a second nondeterministic time interval before the second data is expected to be available from the external memory;
provide a second transmit request the second nondeterministic time interval after reception of the fourth signal;
receive a fifth signal a fourth deterministic time interval after providing the second transmit request, wherein the fifth signal includes the second data; and
storing the second data.

13. The apparatus of claim 9, further comprising:
a counter that is incremented in response to providing a first write request and decremented in response to receiving information indicating completion of the first write request.

14. The apparatus of claim 13, wherein the processor is to receive a sixth signal a third nondeterministic time interval after providing the first write request, wherein the sixth signal indicates that the first write request has been completed.

15. The apparatus of claim 13, wherein the processor is to provide a persistent write request including a second data and an indication that the second data is to be written to the external memory.

16. A method comprising:
accessing, by a controller, first data from a memory or a cache in response to receiving a read request from a processor;
transmitting, by the controller, a first signal at a first nondeterministic time interval after receiving the read request, wherein the first signal indicates that the accessed first data is available for transmission to the processor; and
transmitting, by the controller, a second signal at a first deterministic time interval after receiving a first transmit request sent by the processor in response to the first signal, wherein the second signal includes the accessed first data.

17. The method of claim 16, wherein transmitting the second signal further comprises transmitting the second signal including at least one of an identifier associated with the read request and error correction information formed using the first data.

18. The method of claim 16, further comprising:
receiving a speculative read request from the processor for second data;
transmitting a third signal a second deterministic time interval after receiving the speculative read request in response to the second data being in the cache;
transmitting a fourth signal a third deterministic time interval after receiving the speculative read request in response to the second data not being in the cache, the fourth signal indicating an estimate of a second nondeterministic time interval before the second data is expected to be available from the memory; and
transmitting a fifth signal a fourth deterministic time interval after receiving a second transmit request from the processor in response to the fourth signal, wherein the fifth signal includes the second data.

19. The method of claim 16, further comprising:
receiving a write request;

buffering the write request until the write request is completed;

incrementing a counter in response to receiving the write request; and decrementing the counter in response to completing the write request.

20. The method of claim 19, further comprising:

transmitting a sixth signal a third nondeterministic time interval after receiving the write request, wherein the sixth signal indicates that the write request has been completed.

\* \* \* \* \*